United States Patent Office 2,745,885
Patented May 15, 1956

2,745,885
1-CHLORO-1,2,3,4,4-PENTAFLUORO-1,3-BUTADIENE

Robert P. Ruh and Ralph A. Davis, Midland, Mich., assignors to The Dow Chemical Company, Midland, Mich., a corporation of Delaware No Drawing. Application June 24, 1953,
Serial No. 363,949

1 Claim. (Cl. 260—653)

This invention concerns a new compound, 1-chloro-1,2,3,4,4-pentafluoro-1,3-butadiene, and a method for its preparation.

This compound, $CFCl=CF-CF=CF_2$, is a low boiling, nonflammable liquid which exhibits strong parasiticidal activity against fungi, bacteria, and insects. It is surprisingly effective in the fumigation of grains for the control of such insects as the confused flour beetle, the black carpet beetle, and the granary weevil. This new chlorofluorobutadiene may also be polymerized to give high molecular weight rubbery polymers which are stable against heat and oxidation.

According to the process of the invention, $$CFCl=CF-CF=CF_2$$

is prepared by the dechlorination of 1,1,2,3,4-pentachloro-1,2,3,4,4-pentafluorobutane, $$CFCl_2-CFCl-CFCl-CF_2Cl$$

with zinc in the presence of a lower alkanol under essentially anhydrous conditions. The alkanols which may advantageously be employed in the instant process are those having less than six carbon atoms per molecule, such as methanol, ethanol, isopropanol, sec-butanol, etc. Usually $CFCl_2-CFCl-CFCl-CF_2Cl$ is dissolved in an equal volume of absolute ethanol and added gradually to a slurry of powdered zinc in absolute ethanol. A sufficiently large amount of zinc to remove four chlorine atoms from each molecule of the chlorofluorobutane is generally employed, e. g. slightly greater than two atomic proportions of zinc per molecular proportion of $CFCl_2-CFCl-CFCl-CF_2Cl$. The dechlorination reaction is highly exothermic and may be represented by the following equation:

$$CFCl_2-CFCl-CFCl-CF_2Cl+2Zn \rightarrow CFCl=CF-CF=CF_2+2ZnCl_2$$

The reaction may be carried out in a glass flask or ceramic-lined vessel equipped with a water-cooled reflux condenser. Although the reaction will proceed readily at 25° C., the temperature at which the reaction is generally conducted is conveniently the reflux temperature of the reaction mixture, viz. approximately 80° C. when ethanol is the alcoholic solvent. The rate at which the 1-chloro-1,2,3,4-4-pentafluoro-1,3-butadiene product is formed is roughly proportional to the rate of addition of the chlorofluorobutane reactant, i. e. dechlorination occurs almost instantaneously upon bringing the reactants into contact. Upon adding all the chlorofluorobutane, the reaction mixture is heated for a short period of time to insure essentially complete reaction. The organic product is thereafter usually washed with water to remove alcohol and zinc chloride, dried, e. g. with anhydrous calcium chloride, and fractionally distilled to separate the $CFCl=CF-CF=CF_2$.

The following example illustrates the process of the invention, but is not to be construed as limitative:

Example 1-chloro-1,2,3,4,4-pentafluoro-1,3-butadiene was prepared by the dechlorination of 1,1,2,3,4-pentachloro-1,2,3,4,4-pentafluorobutane according to the procedure hereinafter described:

The 1,1,2,3,4 - pentachloro - 1,2,3,4,4 - pentafluorobutane starting material employed in the dechlorination reaction was prepared by the fluorination of the known compound 1,1,2,3,4,4 - hexachloro - 1,2,3,4 - tetrafluorobutane. The fluorination reaction was carried out by heating 1,1,2,3,4,4 - hexachloro - 1,2,3,4 - tetrafluorobutane and a slightly greater than theoretical proportion of $SbCl_2F_3$ in a closed reaction vessel at a temperature of about 250° C. for a period of several hours. Thereafter, the reaction product was cooled, washed with water, and dried. The dry organic product so obtained was fractionally distilled to separate 1,1,2,3,4-pentachloro-1,2,3,4,4-pentafluorobutane, $$CFCl_2-CFCl-CFCl-CF_2Cl$$

boiling at 168° C. at 739 mm. Hg absolute. This material was employed to prepare 1-chloro-1,2,3,4,4-pentafluoro-1,3-butadiene, $CFCl=CF-CF=CF_2$, as described below:

Into a 2-liter glass flask equipped with a dropping funnel, water-cooled reflux condenser, and mechanical stirring device were charged 317 grams (4.84 moles) of powdered zinc and 75 ml. of absolute ethanol. Thereafter 708 grams (2.2 moles) of $$CFCl_2-CFCl-CFCl-CF_2Cl$$

dissolved in an equal volume of absolute ethanol was gradually added to the reaction flask during a period of 3 hours at a rate such as to maintain a steady reflux of the absolute ethanol. When all of the alcoholic solution of $CFCl_2-CFCl-CFCl-CF_2Cl$ had been added to the flask, 275 ml. of additional ethanol was added and the reaction mixture was heated under reflux for eight hours longer. The reaction product was then cooled, washed with water, and dried over $CaSO_4$. Fractional distillation of the dry product gave the following fractions: 197 grams of crude $CFCl=CF-CF=CF_2$ boiling from 35° to 42.5° C. at 745 mm. Hg abs., 56 grams of $C_4Cl_3F_5$ fraction boiling from 96° to 100.5° C. at 748 mm. Hg abs., and 30 grams of recovered starting material, $CFCl_2-CFCl-CFCl-CF_2Cl$. Based on the total moles of $CFCl_2-CFCl-CFCl-CF_2Cl$ employed in the dechlorination reaction, the conversion to $$CFCl=CF-CF=CF_2$$

was 47.7 mole per cent.

From the crude $CFCl=CF-CF=CF_2$ fraction, there was obtained by fractional distillation a water-white liquid having a boiling point of 35–38° C. at 745 mm. Hg abs. and a specific gravity at 25° C. of 1.471. This liquid compound was identified as $CFCl=CF-CF=CF_2$, the weight per cent composition of which is compared with theory in the following table:

| $CFCl=CF-CF-CF_2$ | Observed | Theory |
|---|---|---|
| Carbon | 24.28 | 26.89 |
| Chlorine | 19.45 | 19.89 |
| Fluorine | 52.9 | 53.22 |

The 1 - chloro - 1,2,3,4,4 - pentafluoro - 1,3 - butadiene prepared as above was tested as a fumigant by exposing a considerable number of black carpet beetle larvae and confused flour beetle adults to the vapors of this compound. The fumigation was carried out for a period of 16 hours in a closed chamber at a temperature of about 25° C. and at a concentration of 0.5 pound of 1 - chloro - 1,2,3,4,4-pentafluoro - 1,3 - butadiene per 1000 cubic feet of space. As a result of this operation, a 100% kill of both species of insects was obtained.

That which is claimed is:
1 - chloro - 1,2,3,4,4 - pentafluoro - 1,3 - butadiene.

References Cited in the file of this patent

Preparation, Properties and Technology of Fluorine and Organic Fluorine Compounds, Slesser and Schram, page 670 (#33) (1950).